United States Patent [19]
Thornton

[11] Patent Number: 5,431,416
[45] Date of Patent: Jul. 11, 1995

[54] COLLET ATTACHMENT/CLOSER

[76] Inventor: John R. Thornton, 2710 Farm Spur Rd., N. Huntingdon, Pa. 15642

[21] Appl. No.: 142,975

[22] Filed: Oct. 29, 1993

[51] Int. Cl.⁶ .............................................. B23B 31/20
[52] U.S. Cl. ..................................... 279/4.08; 279/51; 279/143
[58] Field of Search .................................... 279/51–53, 279/143, 146, 4.07, 4.08; 409/233

[56] References Cited

U.S. PATENT DOCUMENTS

| | | | |
|---|---|---|---|
| 2,455,586 | 12/1948 | Kooima | 279/4.08 |
| 2,493,926 | 1/1950 | Petsche | 279/51 |
| 2,546,356 | 3/1951 | Wetzel | 279/4.08 |
| 3,625,530 | 12/1971 | Parsons | 279/53 |

FOREIGN PATENT DOCUMENTS

| | | | |
|---|---|---|---|
| 88/07904 | 10/1988 | WIPO | 279/143 |
| 90/05609 | 5/1990 | WIPO | 279/143 |

*Primary Examiner*—Steven C. Bishop
*Attorney, Agent, or Firm*—H. Keith Hauger

[57] ABSTRACT

A collet attachment apparatus for a lathe machine tool including a collet holder for engagement of a spring collet, a nose collet adapter chuck to be fastened to a standard master chuck for engagement of a collet holder. A rear spindle draw tube adapter fastens to a hydraulic actuator to cause axial movement of a drawbar and exert or release pressure on the spring collet. Various lock ring means are utilized to limit the axial movement of the drawbar and ultimately the pressure on the collet.

10 Claims, 3 Drawing Sheets

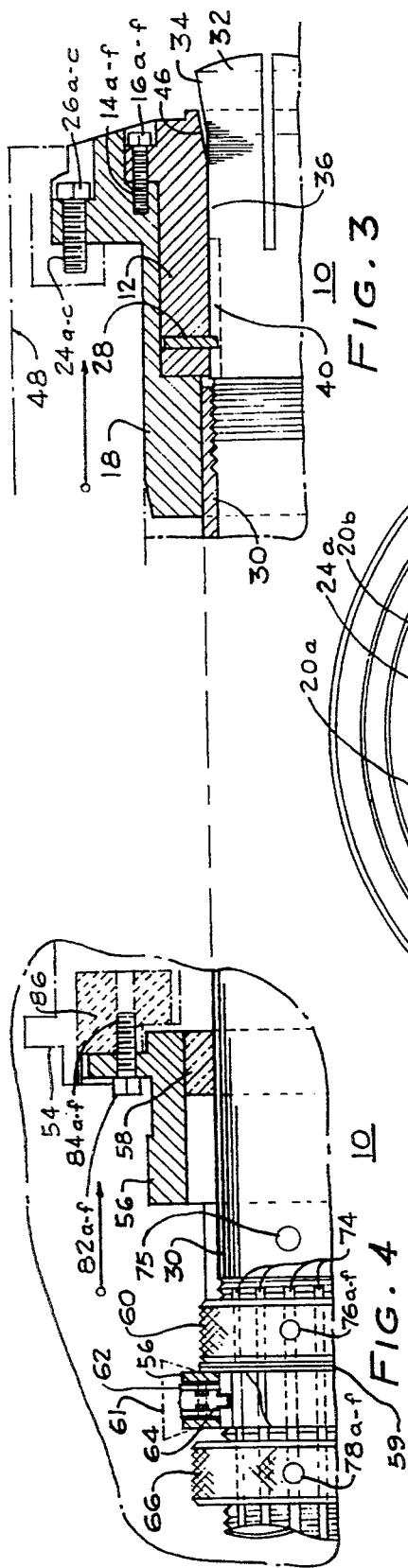
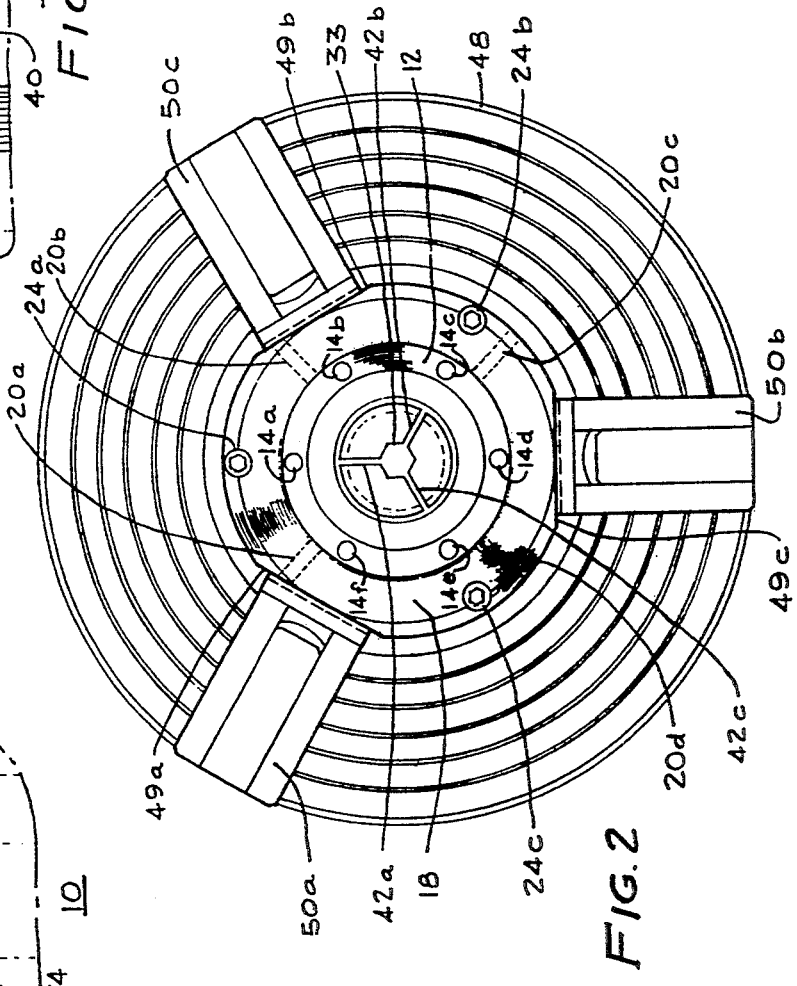

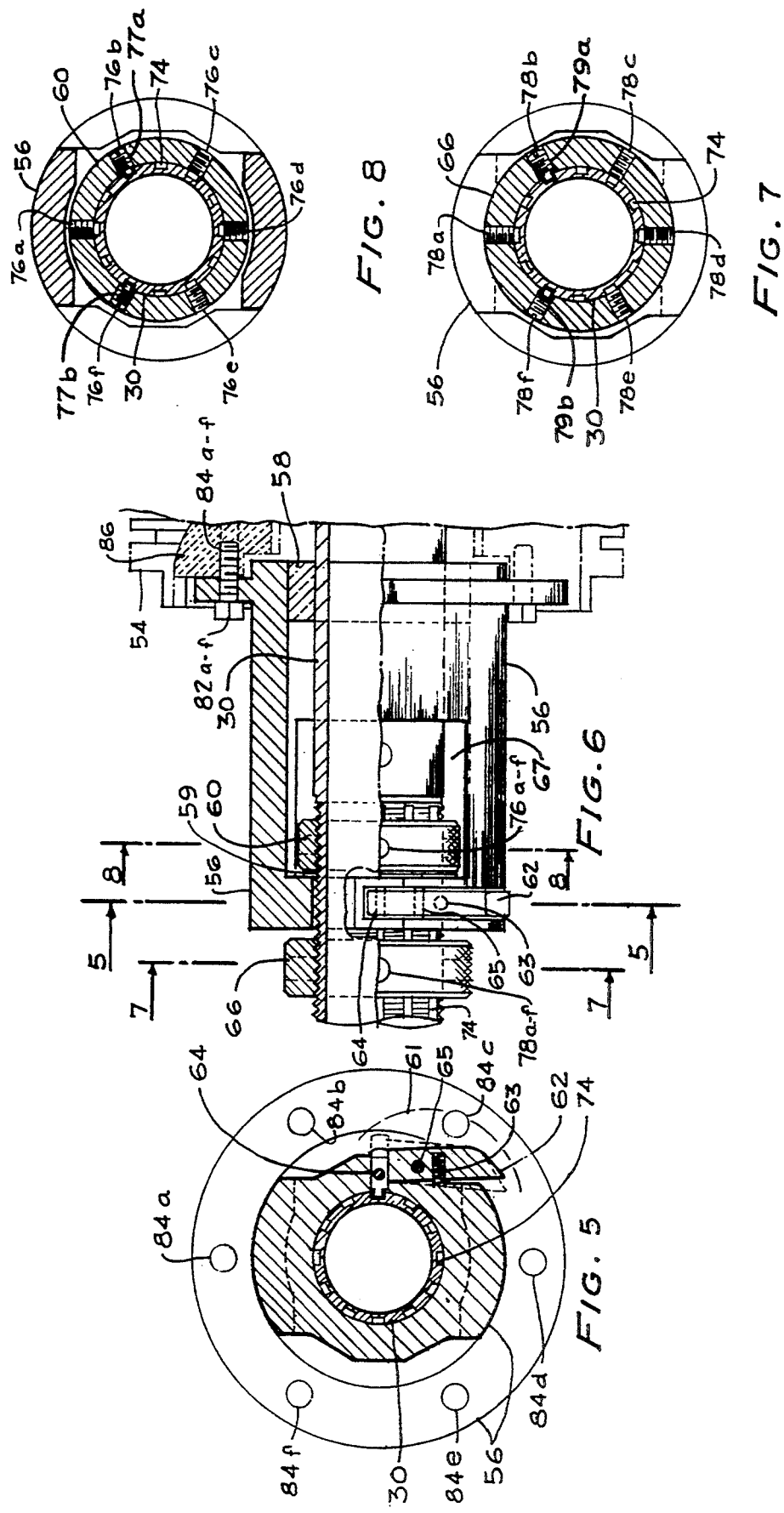

COLLET ATTACHMENT/CLOSER

BACKGROUND OF THE INVENTION

1. Field of the Invention

This invention relates generally to an apparatus to hold a spring collet for a machining process.

2. Description of the Prior Art

The manufacturing facility of our present time must have the highest efficiency and quality control yet at the same time costs of operation must be kept to a minimum, all in an effort to remain competitive in a market that is now more ruthless due to the ever present and expanding global economy of scale. Down time of production machines critical to the manufacturing process is an expensive and wasteful matter causing production managers and manufacturing executives to forever update production equipment and machinery.

Rotating machine tools have been at the foundation of the production manufacturing business. The lathe is one such piece of rotating machinery which has been in use since very early times of manufacturing. The lathe is typically a machine tool with a horizontal spindle for shaping a workpiece by gripping it in a holding device and rotating it under power against a suitable cutting tool for turning, boring, facing or threading primarily cylindrical objects. Chucks are used as the holding device. The chuck is a device standard to most lathes for holding the workpiece rigid, usually by means of adjustable jaws or set screws. The collet is a further refinement to the holding device being a split, coned or tapered sleeve for holding generally small circular workpieces inside the chuck.

An earlier chucking mechanism is shown in Duphily at U.S. Pat. No. 2,430,761 where the chuck is typical operating in cooperation with a series of radially placed jaws to hold a workpiece. U.S. Pat. No. 2,597,712 being another similar chucking mechanism issued to Drissner utilizes a chuck mountable on a spindle for cooperation with a series of jaws. A later edition is seen in U.S. Pat. No. 3,625,530 to Parsons being entitled "Collet Activating Device" including two concentrically arranged tubular members movable axially and annularly relative to the other. All existant devices consist of variously designed chucks that must be removed, rebored and reinstalled to adapt to the various collets available being at considerable down time cost and causing inefficiency on the production line.

Today's manufacturing facility demands a superior collet attachment apparatus that will reduce down time. The invention presented in this application meets and exceeds this criteria.

SUMMARY OF THE INVENTION

It is, therefore, an object of the present invention to provide a collet attachment apparatus enabling most lathe type machine tools to be adaptable to existing chucks.

It is a further object through a collet attachment apparatus to eliminate removal of the chuck and existing hydraulics for insertion of different sized collet holders.

It is a further object to provide a collet attachment apparatus having improved safety and accuracy through locking of the collet holder during operation.

It is a further object to provide a collet attachment apparatus readily adaptable to most existing hydraulic/pneumatic drawbars.

It is a further object to provide a collet attachment apparatus allowing a collet holder to be changed in 15 minutes compared with the present minimum time of 8 hours, practically reducing production downtime significantly.

More specifically, the present invention is a collet attachment means for rotating a machine tool having a rotating drawbar means comprising, in combination a collet holder means for holding a collet; a nose collet adapter chuck means for location within a forward and inside diameter of a master chuck for holding said collet holder means; a rear spindle draw tube adapter means for location with a rearward inside diameter of a hydraulic actuator drawbar for fastening to said hydraulic actuator bar, whereby said drawbar means passes through said rear spindle draw tube adapter means annularly on an inside diameter causing axial movement to said collet within an inside diameter of said nose collet adapter chuck means; a first lock ring means to define axial distance boundaries of said drawbar means for further determining the amount of pressure exerted on a collet holding cavity; a second lock ring means coordinating with said first lock ring means to define said axial distance boundaries of said drawbar means for further determining the amount of said pressure exerted on said collet holding cavity; a draw tube nut means secured to said rearward most point of said drawbar tube for controlling the said axial movement of said collet by rotating said draw tube nut means in a clockwise or counterclockwise direction allowing said collet to be removed or inserted from or into said collet attachment means.

In accordance with the provisions of the Patent Statues, I have explained the principle and operation of my invention and have illustrated and described what I consider to represent the best embodiment thereof.

BRIEF DESCRIPTION OF THE DRAWINGS

For a better understanding of the invention, reference may be had to the accompanying drawings, in which:

FIG. 2 is a detailed chuck end view of a collet attachment apparatus;

FIG. 3 is a detailed view of a chuck end of a collet attachment apparatus;

FIG. 4 is a detailed view of the rear and opposite chuck end of a collet attachment apparatus.

FIG. 5 represents a detailed view of an engaging pin.

FIG. 6 is a detailed view of a window allowing for adjustment of a knurled spring-faced lock ring.

FIG. 7 is a cross sectional view of a second knurled spring faced lock ring.

FIG. 8 is a cross sectional view of a first knurled spring faced lock ring.

DESCRIPTION OF PREFERRED EMBODIMENTS

Figure 1:
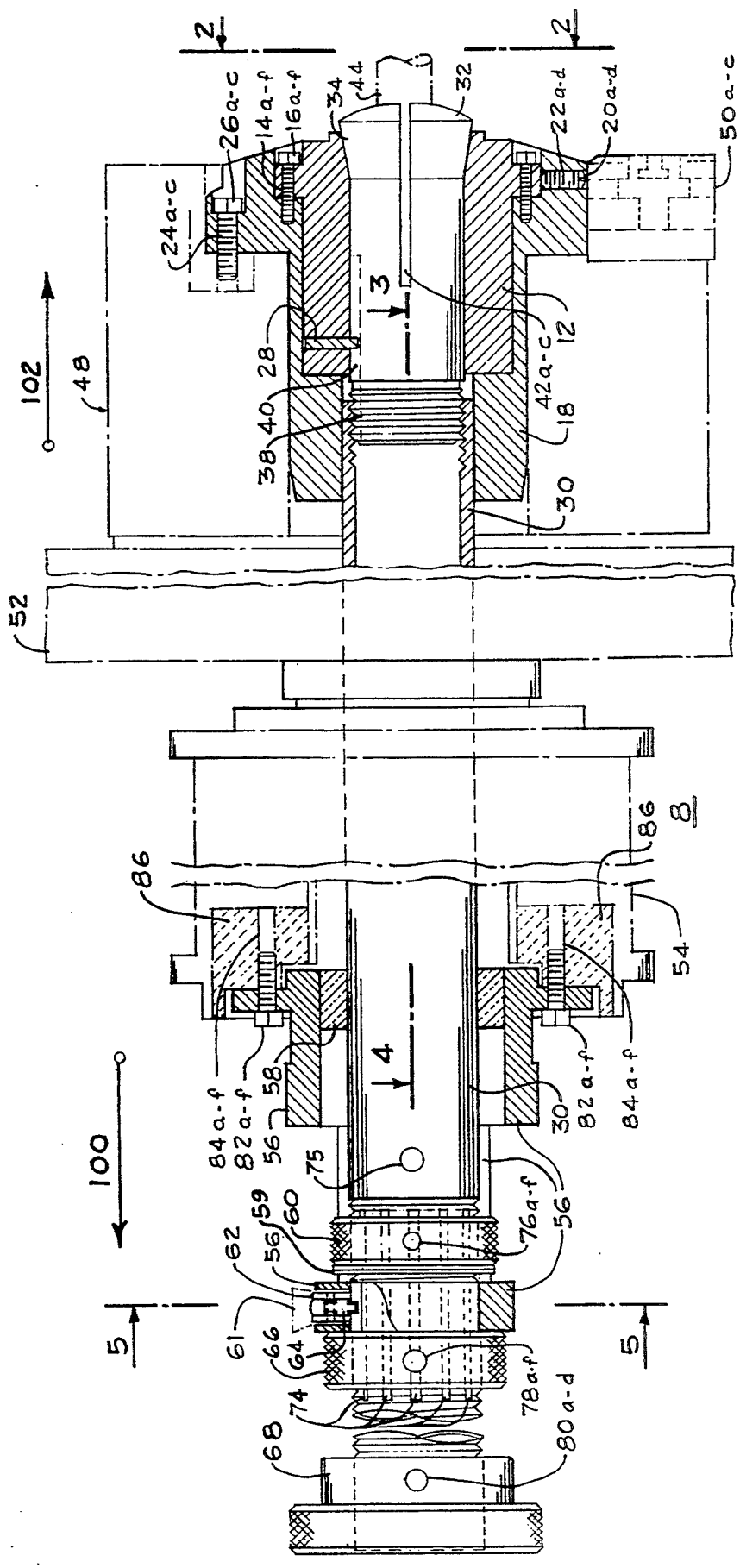
FIG. 1 is a side cross sectional view in part of a collet attachment apparatus.

Referring to the drawings, FIG. 1 and FIG. 3 depict a collet attachment apparatus 10 mounted to a machine tool 8, preferably a lathe, for securing collet 32, where preferably collet 32 is a spring type having a tapered external surface 34 and an opposite internal threaded surface 38 for mating to a drawbar 30. A collet holder 12 engagingly encompasses the collet 32. A nose collet adapter chuck 18, which attaches to master chuck 48 engagingly encompasses the collet holder 12. Master chuck 48 is standard to all machine lathe type tools. The collet holder 12 is an annular configuration machined and ground on its inside diameter to fit collet 32 having a plurality of collet holder bores 14 *a–f* for accepting a plurality of collet holder bolts 16 *a–f* for attachment to nose collet adapter chuck 18. Positioning screws 20 *a–d* in combination with tapped cavities 22 *a–d* permit radial adjustment of collet holder 12 for indications of collet 32 on a workpiece 44 within 0.0002 TIR (total indicator reading).

Nose collet adapter chuck 18 secures to master chuck 48 through a plurality of nose collet adapter chuck bores 24 *a–c* and corresponding nose collet adapter bolts 26 *a–c*. Nose collet adapter chuck 18 has a plurality of equidistant flat linear chordal surfaces 49 *a–c* for accepting pressure from a plurality of corresponding radially sliding gripping jaws 50 *a–c* minimizing movement of drawbar 30.

Collet 32 as viewed from FIG. 2 has collet holding cavity 33 for holding machining member 44 by lateral movement of drawbar 30 which releases pressure or causes pressure between a tapered internal surface 46 of collet holder 12 and a tapered external surface 34 of collet holder 32. Collet 32 has a central cylindrical section 36 having a laterally located plurality of key slots 40 for accepting a drive pin 28, functioning to lock the collet 32 during its rotational mode. Collet slots 42 *a–c* cut radially and equidistantly into collet 32 creating the spring effect at collet holding cavity 33.

Rear spindle draw tube adapter 56 is attached to a hydraulic or pneumatic actuator 54 by a plurality of bores 84 *a–f* and bolts 82 *a–f*. Hydraulic or pneumatic actuator 54 is a standard component to all lathe type machine tools. Rear spindle draw tube adapter 56 encompasses drawbar 30 which moves laterally when actuated by hydraulic or pneumatic actuator 54. Bushing 58 is provided to minimize surface wear on drawbar 30 during lateral movement.

Hydraulic or pneumatic actuator 54 is attached to head stock 52, which encompasses a gearing mechanism (not shown) for regulation of rotations per minute (r.p.m.) of machine tool 8.

Generally a foot pedal (not shown) is used to actuate hydraulic or pneumatic actuator 54 which by being secured to hydraulic actuator drawbar 86 shown in FIG. 1 and FIG. 6 causes hydraulic actuator drawbar 86 to move either laterally left 100 or laterally right 102 as machine tool 8 is viewed in FIG. 1. When hydraulic actuator drawbar 86 moves laterally left 100, it causes drawbar 30 to move likewise laterally left 100 and conversely, when hydraulic actuator drawbar moves laterally right 102, it causes drawbar 30 to move laterally right 102. When drawbar 30 moves laterally left 100, compressive pressure is exerted on external surface 34 of collet holder 32 causing the closure of collet holder 32 on workpiece 44. When drawbar 30 moves laterally right 102, compressive pressure is relieved from external surface 34 of collet holder 32 from workpiece 44. During this lateral movement process, rear spindle draw tube adaptor 56 will contact second knurled spring faced lock ring 66 during the lateral left 100 movement of drawbar 30 stopping said lateral movement. Likewise, when drawbar 30 moves laterally right 102 when rear spindle draw tube adapter 56 contacts first knurled spring faced lock ring 60. The said lateral movement ceases. During this process of lateral movement either to the left or to the right, collet attachment apparatus 10 is in a static and non-rotational mode. The rotational mode of collet attachment apparatus 10 occurs when an operation is desired on workpiece 44. This rotational motion occurs to collet attachment apparatus 10 by causing drawbar 30 and likewise all attached components including collet 32 to rotate.

First knurled spring faced lock ring 60 has a plurality of threaded bores 76 *a–f* located radially and equidistantly on drawbar 30 for acceptance of a plurality of set screws 77*a* and 77*b* making it possible to lock first knurled spring faced lock ring 60 into a plurality of laterally located machine lock slots 74 after first knurled spring faced lock ring 60 is rotated clockwise or counterclockwise to adjust the diameter of collet holding cavity 33 by exerting or releasing pressure thereon between tapered internal surface 46 of collet holder 12 and tapered external surface 34 of collet holder 32. Helical spring lock washers 59 may be located around drawbar 30 between first knurled spring faced lock ring 60 as viewed from access window 67 and second knurled spring faced lock ring 66 to cushion the opening process of spring collet 32.

A releasably locking member 61 consists of an engaging pin 64, release lever 62, lock lever spring 63 and release lever pivot pin 65, which operate to lock drawbar 30 during rotation and prevent any relative rotation of drawbar 30. Engaging pin 64 is engaged into or out of lock slots 74 by depression or release of release lever 62. Lock lever spring 63 prevents release lever 62 from disengaging from lock slots 74 during rotational mode of collet 32.

Second knurled spring faced lock ring 66 locks to drawbar 30 via a plurality of threaded bores 78 *a–f* for acceptance of a plurality of set screws 79*a* and 79*b* after adjustment of the diameter of collet holding cavity 33 and coordinates with first knurled spring faced lock ring 60 to define the axial or lateral movement distance boundaries of drawbar 30.

Knurled draw tube nut 68 locks to drawbar 30 through a plurality of threaded bores 80 *a–d* for acceptance of a plurality of set screws (not shown). Knurled draw tube nut 68 rotates clockwise or counterclockwise for controlling the axial movement of collet 32 allowing collet 32 to be removed or inserted into collet holder 12.

Coolant drain openings 75 allow coolant (various cutting oils) to exit from draw bar 30.

I claim:

1. A collet attachment means for rotating a machine tool having a drawbar means comprising, in combination:

a collet holder means for holding a collet;

a nose collet adapter chuck means for location within a forward and inside diameter of a master chuck for holding said collet holder means;

a rear spindle draw tube adapter means for location within a rearward inside diameter of a hydraulic actuator drawbar for fastening to said hydraulic actuator drawbar, whereby said drawbar means passes through said rear spindle draw tube adapter means annularly on an inside diameter causing left or right axial movement to said collet within an inside diameter of said nose collet adapter chuck means at a time when said drawbar means is non-rotational;

a first lock ring means to define axial distance boundaries of said drawbar means for further determining the amount of pressure exerted on a collet holding cavity;

a second lock ring means coordinating with said first lock ring means to define said axial distance boundaries of said drawbar means for further determining the amount of said pressure exerted on said collet holding cavity;

a draw tube nut means secured to said rearward most point of said drawbar means for controlling said axial movement of said collet by rotating said draw tube nut means in a clockwise or counterclockwise direction allowing said collet to be removed or inserted from or into said collet attachment means.

2. A collet attachment means for a machine tool according to claim 1, having a locking means for prevention of relative rotation of said drawbar means with respect to said rear spindle draw tube adapter means during operational rotation of said drawbar means to perform an operation on a workpiece.

3. A collet attachment means for a machine tool according to claim 1, wherein said collet holder means is of annular form having therein at a collet holder inside diameter said collet holding cavity.

4. A collet attachment means for a machine tool according to claim 1, wherein said nose collet adapter chuck means comprises a plurality of equidistant flat linear surfaces located on a chordal plane of a circumference of said nose collet adapter chuck means, said plurality of equidistant flat linear surfaces for receiving pressure engagement from an equal plurality of corresponding chuck Jaws radially located with respect to said drawbar means axis of rotation and within said master chuck for minimization of eccentricity and dynamic unbalance of said drawbar means during rotational operation.

5. A collet attachment means for a machine tool according to claim 1, wherein said first lock ring means secures to said drawbar means after clockwise or counterclockwise rotation of said first lock ring means for determining a diameter at which said collet holding cavity compresses or releases said collet to secure or release a workpiece.

6. A collet attachment means for a machine tool according to claim 1, wherein said second lock ring means secures to said drawbar means after clockwise or counterclockwise rotation of said second lock ring means for determining said pressure exerted on said collet holding cavity for purposes of securing a workpiece within said collet.

7. A collet attachment means for a machine tool according to claim 2, wherein said locking means consists of a releasing lever cooperating with a pin, said pin for insertion into and release from a plurality of slots located circumferentially and parallel to a rotational axis of drawbar means on a rearward section of said drawbar means, said slots positioned equidistantly from each other, said releasing lever causing the engagement or disengagement of said pin to said plurality of slots, when said pin is in said engagement to said slots said locking means prevents said relative rotation of said drawbar means.

8. A collet attachment means for a machine tool according to claim 5, wherein said first lock ring means secures to said drawbar means through a plurality of diametrically opposite and opposing tapped cavities for acceptance of socket fastening means, said socket fastening means when fully tightened extend into a plurality of corresponding slots located circumferentially and parallel to a rotational axis of said drawbar means on a rearward section of said drawbar means, further comprising a plurality of spring locking ring means located between said rear spindle draw tube adapter means and said second lock ring means for cushioning an opening process of said collet.

9. A collet attachment means for a machine tool according to claim 6, wherein said second lock ring means secures to said drawbar means through a plurality of diametrically opposite and opposing tapped cavities for acceptance of socket fastening means, said socket fastening means when fully tightened extends into a plurality of corresponding slots located circumferentially and parallel to an axis of drawbar means on a rearward section of said drawbar means, said lock ring means for cooperation with said first lock ring means to define said axial distance boundaries of said drawbar means.

10. A collet attachment means for a machine tool comprising, in combination:

a drawbar means for rotational actuation of said collet attachment means along a horizontal axis to perform an operation on a workpiece;

a nose collet adapter chuck means for location within a forward and inside diameter of a master chuck for holding a collet holder means, said collet holder means being an annular configuration having therein at a collet holder inside diameter a collet holding cavity for encasing a collet;

a locking means for prevention of relative rotational movement of said drawbar means with respect to a rear spindle draw tube adapter means along said horizontal axis during rotation of said drawbar means;

wherein said rear spindle draw tube adapter means for location within a rearward inside diameter of a hydraulic actuator drawbar, for fastening to said hydraulic actuator drawbar, whereby said drawbar means passes through said rear spindle draw tube adapter means at an inside diameter of said rear spindle draw tube adapter means causing left or right axial movement of said collet within an inside diameter of said nose collet adapter chuck means at a time when said drawbar means is non-rotational;

a first lock ring means for clockwise or counterclockwise rotation around said drawbar means to define axial distance boundaries of said drawbar means, for further determining the amount of pressure exerted on a tapered portion of said collet holding cavity to secure or release said workpiece from said collet;

a second lock ring means for clockwise or counterclockwise rotation around said drawbar means to define axial distance boundaries of said drawbar means for further determining the amount of pressure exerted on said tapered portion of said collet holding cavity to secure or release said workpiece.

* * * * *